United States Patent
Sabapathy et al.

(10) Patent No.: US 8,563,195 B2
(45) Date of Patent: Oct. 22, 2013

(54) FUEL CELL POWER MODULE FRAME ASSEMBLY

(75) Inventors: Anthony Sabapathy, Mississauga (CA); Vicente Nunes, Mississauga (CA); Andrew Hill, Brampton (CA); Igor Kvachnine, Mississauga (CA)

(73) Assignee: Hydrogenics Corporation, Mississauga, ON. (CA)

( * ) Notice: Subject to any disclaimer, the term of this patent is extended or adjusted under 35 U.S.C. 154(b) by 1058 days.

(21) Appl. No.: 12/329,073

(22) Filed: Dec. 5, 2008

(65) Prior Publication Data

US 2009/0155655 A1    Jun. 18, 2009

Related U.S. Application Data

(60) Provisional application No. 61/012,270, filed on Dec. 7, 2007.

(51) Int. Cl.
*H01M 2/08* (2006.01)

(52) U.S. Cl.
USPC .............................. 429/507; 429/508; 429/509

(58) Field of Classification Search
USPC ........................................... 429/507, 508, 509
See application file for complete search history.

(56) References Cited

U.S. PATENT DOCUMENTS

| | | |
|---|---|---|
| 7,207,405 B2 | 4/2007 | Reid et al. |
| 2005/0095500 A1 | 5/2005 | Corless et al. |

*Primary Examiner* — Jane Rhee
(74) *Attorney, Agent, or Firm* — Scott Pundsack; Borden Ladner Gervais LLP (57) ABSTRACT

A frame assembly for a fuel cell power module, particularly but not exclusively for use in lift trucks, has at least one frame element. The frame element is provided with an internal cavity that is filled with a fill material to provide a desired mass of the frame assembly. The frame assembly is configured to receive a fuel cell stack and other balance of plant components of a fuel cell power module and may also be configured to receive a fuel storage vessel. The frame assembly can be configured so that it can replace a battery pack of a lift truck and still provide adequate counterweight.

20 Claims, 7 Drawing Sheets

FUEL CELL POWER MODULE FRAME ASSEMBLY

CROSS REFERENCE TO RELATED APPLICATIONS

This application claims priority under USC 119(e) from U.S. Provisional Patent Application Ser. No. 61/012,270, filed on Dec. 7, 2007, entitled "FUEL CELL POWER MODULE FRAME ASSEMBLY FOR LIFT TRUCK APPLICATIONS".

FIELD

This invention relates to a frame or housing for a fuel cell power module, and more particularly, but not exclusively, is concerned with a frame or housing for a fuel cell power module for use in lift trucks.

BACKGROUND

The following paragraphs are not an admission that anything discussed in them is prior art or part of the knowledge of persons skilled in the art.

Many lift trucks, particularly those for use indoors, e.g., in warehouses and the like, have been powered electrically, to avoid the issue of discharge and accumulation of fumes from an internal combustion engine. For this purpose, they are often provided with large battery packs of lead acid batteries.

These battery packs may be large and cumbersome. For a lift truck operated continuously, e.g., operated by running three eight hour shifts a day, it may be necessary to provide up to three full battery packs, one of which is in use at any one time, one of which is being charged, the other of which is left to cool after being charged, for example. Additionally, resources may be required for maintaining a charging station, including necessary equipment, personnel to operate it, etc.

Thus, while the cost of an individual battery pack for a lift truck may be reasonable, the overall costs with maintaining the necessary battery packs to operate a lift truck can be substantial.

It is therefore desirable, for at least some applications, to consider alternative power sources for an electric lift truck, and for other electric vehicles and the like, which do not require the cost and complexity of charging large battery packs.

It is has been proposed to use a fuel cell stack as a power source instead of a battery pack. A fuel cell stack, incorporated into a complete fuel cell power pack or module (FCPP), has a number of advantages. A fuel cell stack can run continuously, provided it is supplied with fuel. To recharge a FCPP, it is necessary only to recharge a fuel storage device, e.g., a hydrogen storage cylinder, forming part of the FCPP. Commonly, the oxidant necessary as the other reactant for the fuel cell is drawn from the air. A hydrogen cylinder or other fuel storage device can be recharged quickly and simply, and does not require a cool down period or anything similar.

Thus, a single FCPP can be used to replace the battery pack of an electric lift truck, and further applications.

SUMMARY

The following introduction is intended to introduce the reader to this specification but not to define any invention. One or more inventions may reside in a combination or sub-combination of the apparatus elements or method steps described below or in other parts of this document. The inventor does not waive or disclaim his rights to any invention or inventions disclosed in this specification merely by not describing such other invention or inventions in the claims.

One consideration for a lift truck is that a conventional lead-acid battery power pack, in addition to providing the necessary power for the lift truck, also provides a significant balance weight. Many lift truck designs are based on the fact that the lead-acid battery pack will provide a necessary counterweight, enabling the lift truck to lift specified design loads. If this counterweight is missing, then the truck is unstable and cannot lift the required maximum design loads.

Accordingly, when replacing a battery pack with a FCPP, it is at least some times necessary for the FCPP to replicate not only the electrical characteristics of the battery pack, but also to provide the necessary mass so as to act as a counterweight.

In one aspect, the present invention provides a frame assembly for use with a fuel cell power module, the frame assembly comprising: at least one element including an internal cavity; a fill material located in the cavity to provide a desired mass of the frame assembly; and a plurality of portions providing at least one mounting surface for receiving the fuel cell stack and balance of plant components of a fuel cell power module.

In another aspect, the present invention provides a frame assembly for use in a fuel cell power module, the frame assembly comprising a plurality of elements configured to receive a fuel cell stack, a fuel cell storage vessel and balance of plant components for a fuel cell power module, wherein at least one element of the frame assembly includes a cavity and a fill material in the cavity to provide a desired mass of the frame assembly.

The fill material may be a high density material to increase the mass of the frame assembly. The at least one element including a cavity may be formed by casting. The at least one element formed by casting may comprise iron and the material for the cavity in the at least one element may have been placed therein in molten form and then solidified. The material filling the cavity of the at least one element may comprises lead. The frame assembly may include a closure panel for each cavity.

In another aspect, the present invention provides a frame assembly for a fuel cell power module, wherein the frame assembly is configured to receive a fuel cell stack, a fuel storage vessel and balance of plant components of the fuel cell power module, wherein at least one element of the frame assembly includes a cavity, with the cavity filled with a material of a higher density then the material of said element to increase the mass thereof, and wherein the frame assembly is configured to correspond to the dimensions of a battery pack for a lift truck.

In another aspect, the present invention provides a frame assembly for a fuel cell power module, the frame assembly comprising a bottom element and a top element, wherein the top and bottom elements together are configured to substantially enclose a fuel storage vessel, wherein the top and bottom elements are configured to receive a fuel cell stack and balance of plant components of a fuel cell power module, and wherein at least one of the top and bottom elements includes an internal cavity and the internal cavity is filled with a fill material to provide a desired mass of the frame assembly.

The fill material may be a high density material to increase the mass of the frame assembly.

The top and bottom elements may be configured to receive a fuel storage vessel that is generally cylindrical with hemispherical end portions. The top and bottom elements include complementary fuel cavities for receiving a fuel storage vessel, and recesses for securing straps for securing the fuel storage vessel to one of the top and bottom elements. Both of the top and bottom elements may include an internal cavity and the top element may be open at one side thereof to reveal the internal cavity thereof and the bottom element may be open at the bottom to reveal the internal cavity thereof. Each of the top and bottom elements may be provided with a closure panel secured thereto, for closing off the internal cavities of the top and bottom elements. The top element may include an upper shelf for accommodating elements of the fuel cell power module. The bottom element may include an outer sidewall defining an elongate rectangular slot portion, for receiving elements of a fuel cell power module. One of the top and bottom elements may include threaded bores and the other of the top and bottom elements may include openings for receiving fasteners, for engaging the threaded bores to secure the top and bottom elements together.

In another aspect, the present invention provides a fuel cell power module comprising a frame assembly as described above, further comprising: a fuel cell stack mounted on the frame assembly; a fuel storage device mounted on the frame assembly; and balance of plant components mounted on the frame assembly. The balance of plant components may include at least one electronics component, and the frame assembly may be configured to dissipate heat from the electronics component. The balance of plant components may also include one or more components selected from: a pump, a valve, a humidifier, a radiator for discharging excess heat, and a control unit. The fuel cell power module may be provided in combination with a lift truck.

In yet another aspect, the present invention provides a method of forming a frame component for use in a frame assembly for a fuel cell power module, the method for comprising the steps of: configuring the frame element to receive at least one of a fuel storage vessel, at least one component of a balance of plant components of a fuel cell power module and a fuel cell stack; providing the frame element with at least one planar outer face; providing the frame element with an internal cavity opening onto the outer face; and filling the internal cavity of the frame element with a fill material having a desired density. The fill material may have a higher density than the material of the frame element.

The method may include forming the frame element by casting, and the step of filling the internal cavity includes pouring a material into a cavity in liquid form and permitting the material to solidify.

The method may also include forming the frame element by casting from iron and providing the fill material in the cavity in molten form at an elevated temperature, and permitting the fill material to cool and to solidify.

BRIEF DESCRIPTION OF THE DRAWINGS

For a better understanding of the present invention and to show more clearly how it may be carried into effect, reference will now be made, by way of example, to the accompanying drawings which show, by way of example, one or more embodiments of the present invention and in which.

DETAILED DESCRIPTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
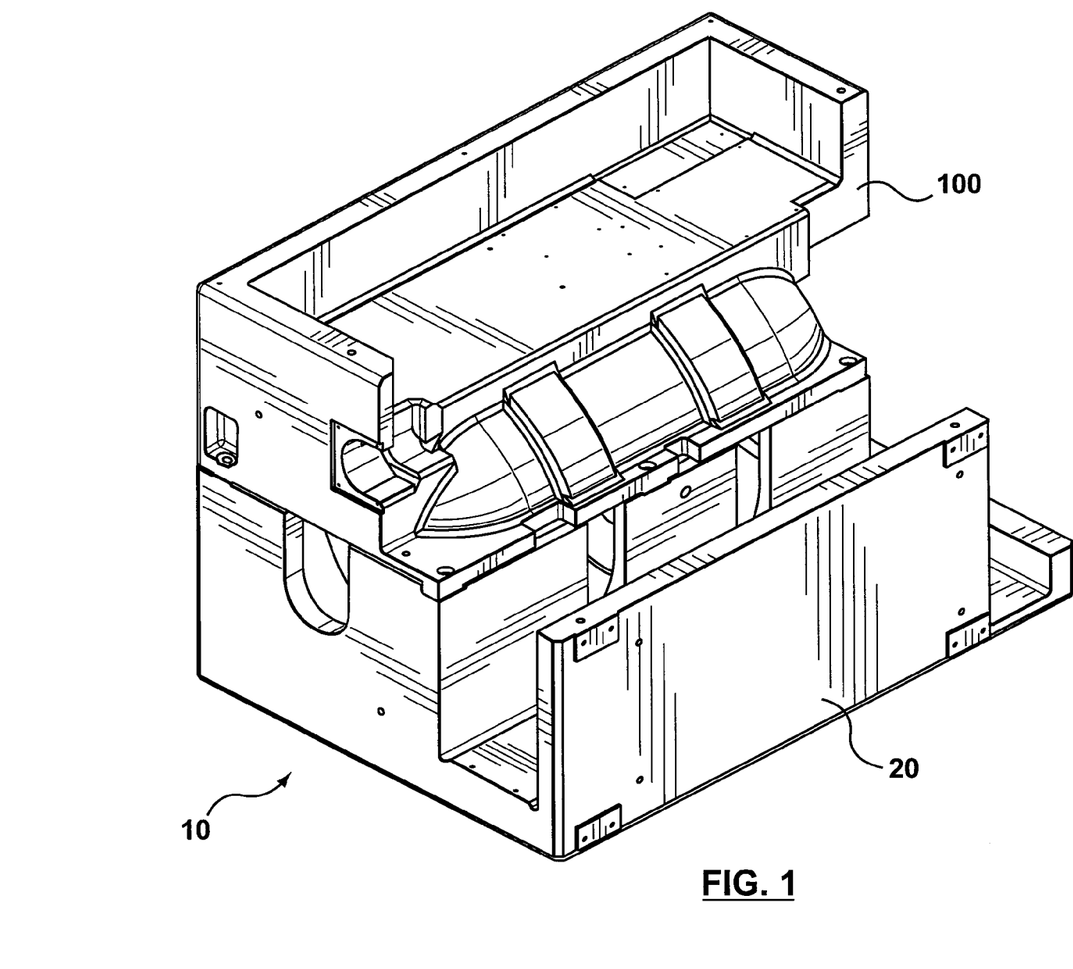
FIG. 1 is a perspective view of a complete frame assembly in accordance with the present invention.
Figure 2:
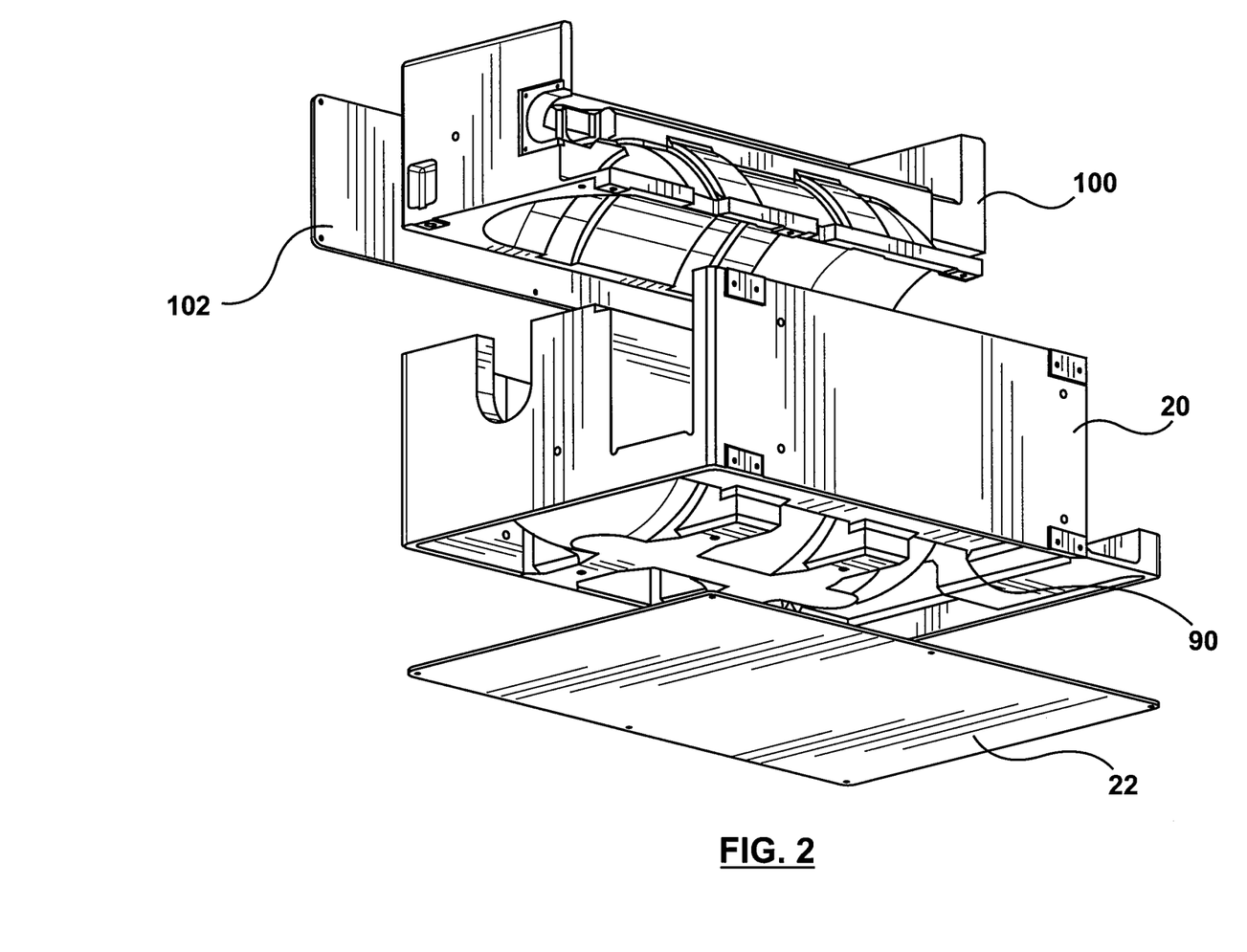
FIG. 2 is a perspective view from below of the elements of the frame assembly of FIG. 1 shown in an exploded view.
Figure 3:
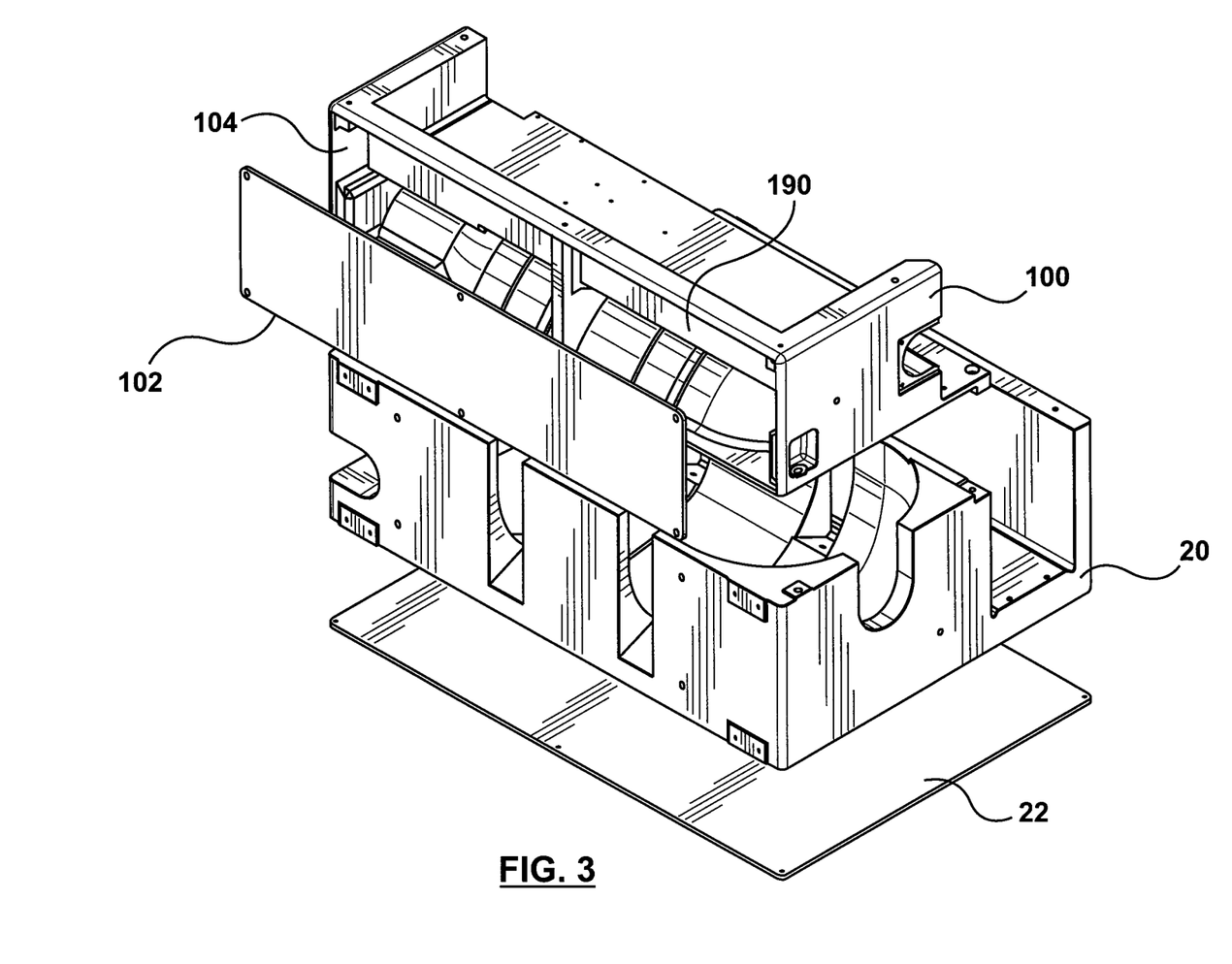
FIG. 3 is an exploded view, similar to FIG. 2, but taken from above showing the elements of the frame assembly.

Referring to FIG. 1, a frame assembly in accordance with the present invention is indicated generally by the reference 10. Frame assembly 10 includes a bottom element 20 and a top element 100. The bottom and top elements 20, 100 are shown, together with closure panels 22 and 102, in FIGS. 2 and 3, in addition to FIG. 1. The optional closure panels 22, 102 close off respective internal cavities 90, 190. The cavity 90 of the bottom element opens facing downwards at a bottom face 94. The cavity 190 is open at a side face of the top element 100. FIGS. 4-8 show details of the bottom element 20, while FIGS. 9-13 show details of the top element 100.

It should be appreciated that terms such as top, bottom, etc., are used in this disclosure for the sake of clarity and relate generally to the position of the frame assembly when installed and in accordance with the specific examples illustrated. The present invention is not intended to be limited to particular orientations of the elements 20, 100, for example, and that various orientations are of course possible.

Referring to FIGS. 4-8, the bottom element 20, in plan view, is generally rectangular and, correspondingly, sides and ends of the bottom element 20 are also generally rectangular.

The bottom element 20 has a cavity 24 shaped to correspond to, approximately, half of a hydrogen storage vessel. It will be understood that the cavity 24 can be shaped for any storage vessel, but here is shaped to accept storage cylinder as manufactured by Dynetek Industries Ltd., which may, for example, be adapted to operate at a pressure of up to 350-700 bar. In known manner, such a storage cylinder has a central portion that is generally cylindrical and end portions that are approximately hemispherical.

Correspondingly, the cavity 24 has a central generally cylindrical portion 26 and end portions 28, 30 that have a hemispherical profile. An end face or wall 32 of the bottom element 20 has a slot 34 to accommodate an end protrusion of a storage cylinder.

At the other end, the end portion 30 includes a cut away section 36, to accommodate connections to the storage cylinder.

To accommodate a pair of fastening straps (not shown) to secure the hydrogen storage cylinder in place, the cavity 24 includes a pair of recesses 38. For the purposes of securing a storage cylinder in place, sidewalls 40, 42 on either side of the cavity 24 include slots 44. At the bottom of each slot 44, there is a threaded bore 46, for receiving a fastening element. This enables the fastening straps to be located around a storage cylinder (both not shown) and secured with bolts or the like in the threaded bores 46.

The sidewall 42 forms an interior sidewall, that faces an outer sidewall 50, having inner and outer sides 52, 54. A bottom wall 56 joins the inner side 52 to the sidewall 42. The walls 42, 50 and 56 together define an elongate rectangular slot 62 that houses elements of a FCPP, such as ultra capacitors, for example.

Figure 7:
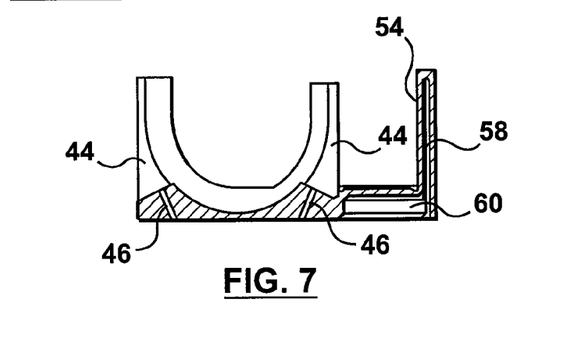
FIG. 7 is a cross-sectional view along line a-a of FIG. 5*a*.
Figure 8:
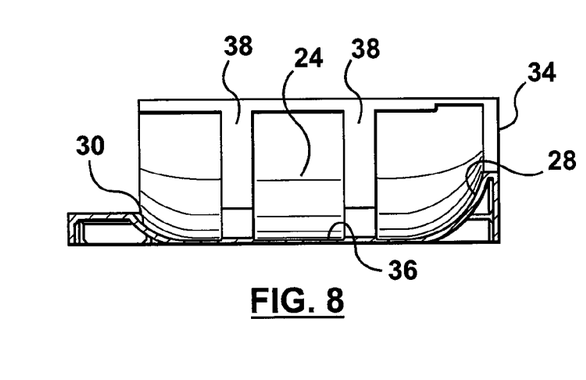
FIG. 8 is a cross-sectional view along line b-b of FIG. 5*a*.

As shown in FIG. 7, the outer sidewall 50 is partially hollow at 58 and the bottom wall 56 is set back, so as similarly to present a cavity or hollow 60, that is part of overall interior cavity 90.

At the end opposite to the end face or wall 32, there is the recess 70 for accommodating other elements of a FCPP, such as a process water removal system, for example.

Figure 4A:
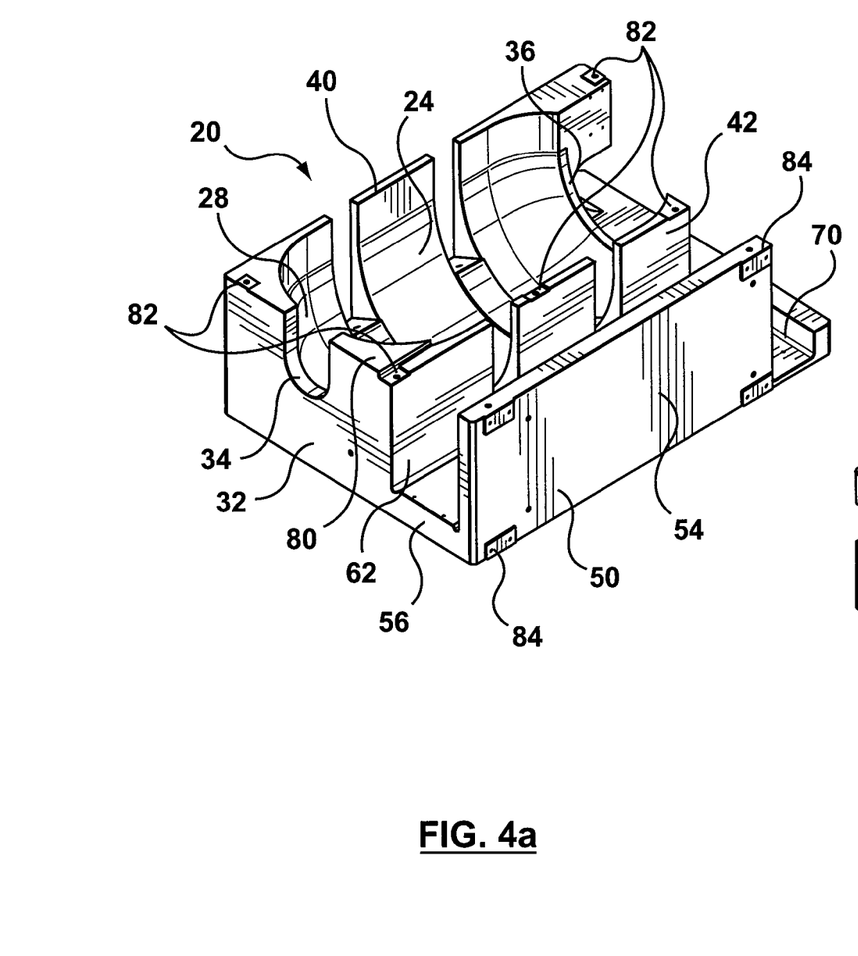
FIGS. 4*a* and 4*b* are perspective views taken from above and below, respectively, of a bottom element of the frame assembly.
Figure 4B:
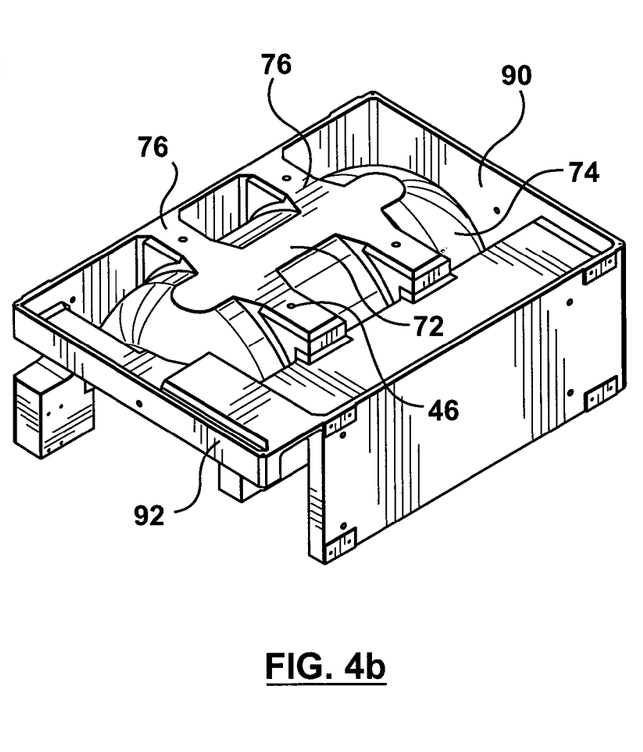

Turning to the underside view of the bottom element 20 as shown in FIG. 4B, it can be seen that, to a large extent, the cavity 90, corresponds to the top profile of the bottom element 20. To provide reinforcement and support for the cavity 24, a strip 72 extends along the bottom of a wall portion 74 defining the cavity 24. This strip 72 is flush and coplanar with low edges of the side and end walls 32, 40, 50.

Extending across the wall portion 74, there are reinforcing portions 76 that are solid and include the bores 46 for fastening of the storage cylinder in place. For fastening the closure panel 22 in place, threaded bores 66 are provided.

The cavity 90 also includes the hollow or cavity 60, and a recess 92 extending around the recess 70.

Figure 5A:
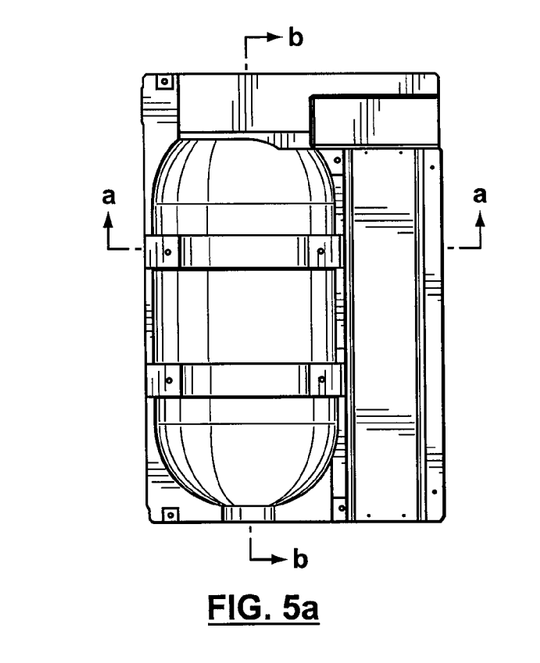
FIGS. 5*a* and 5*b* are, respectively, top and bottom plan views of the bottom element of the frame assembly.
Figure 5B:
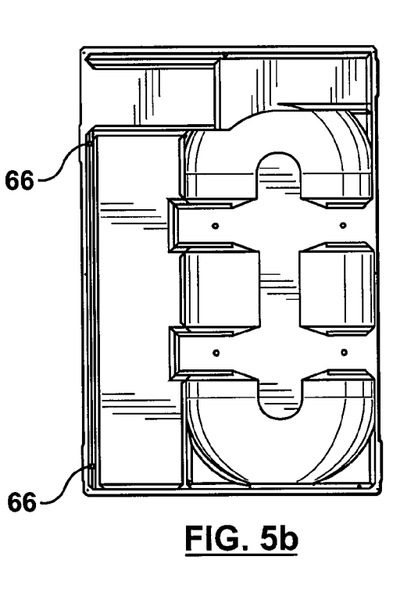
Figure 6A:
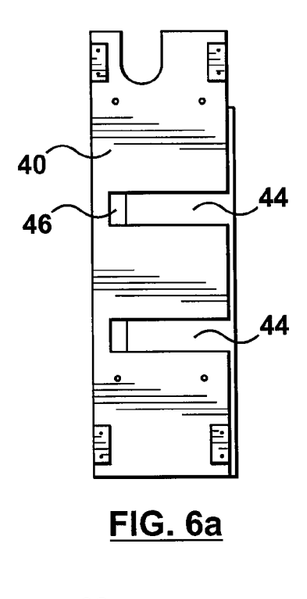
FIGS. 6*a* and 6*b* are views of one side and the other side of the bottom element of the frame assembly.
Figure 6B:
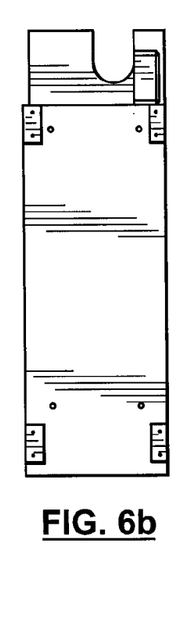

For securing the top element 100 to the bottom element 20, there are provided on a top surface 80 of the bottom element 20, threaded bores 82 for receiving fastening elements. The sidewall 50 includes additional threaded bores 84 for receiving other fastening elements.

Turning to FIGS. 9-13, details of the top element 100 are now described. One function of the top element 100 is to provide a cover for the hydrogen storage cylinder. As such the top element 100 has the cavity 190 that, complementary to the bottom element 20, corresponds to the profile of a hydrogen storage cylinder. Thus the cavity 190 has a central cylindrical portion 112 and end portions 114, 116 that have a hemispherical profile. This also includes generally annular recesses 118 for accommodating straps for tying down and securing a hydrogen storage cylinder.

The top element 100 has end walls 120 and 122 and an outer sidewall 124. The outer sidewall 124 is generally open so as to give access to the internal cavity 190.

Corresponding to the threaded bores 82 of the bottom element 20, the top element 100 includes opening 130 for accommodating fastening elements. It can be noted that the end walls 120, 122 include recesses 132 to enable access to the corresponding openings 130, so that threaded fastening elements can be passed through the respective openings 130 into the bores 82 of the bottom element 20.

Figure 9A:
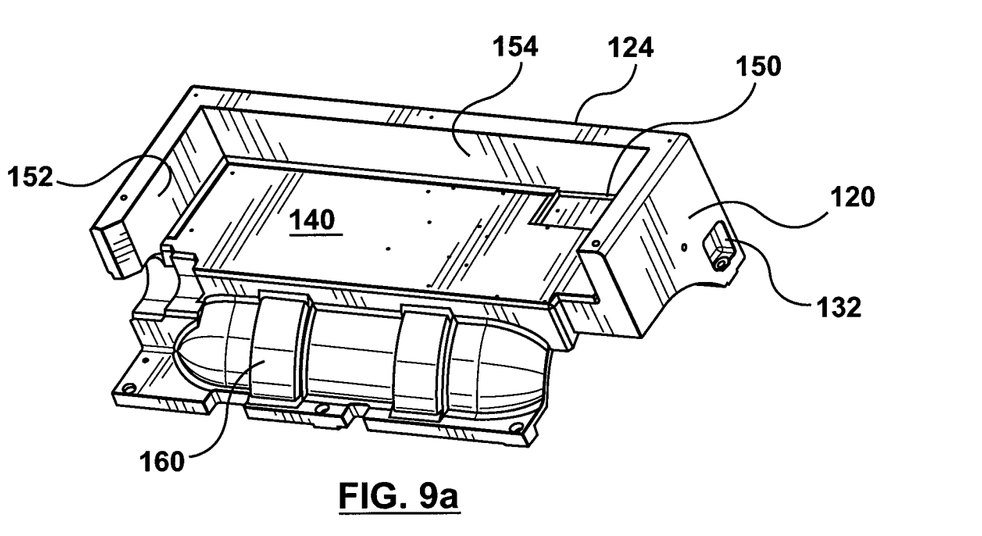
FIGS. 9*a* and 9*b* are, respectively, perspective top and bottom views of a top element of the frame assembly.

As shown in FIG. 9a, at the top, the top element 100 provides an upper shelf 140. Set inwards from the end walls 120,122 and the sidewall 124 are corresponding wall portions 150, 152, 154. As indicated in a sectional view of FIG. 12b the internal cavity 190 extends between these wall portions 150, 152, 154 and their corresponding walls 120, 122, 124.

Figure 10:
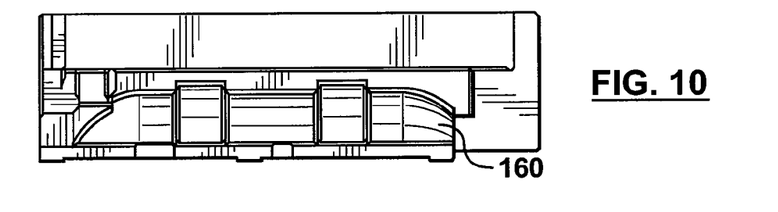
FIG. 10 is a view of the top element from one side.
Figure 11:
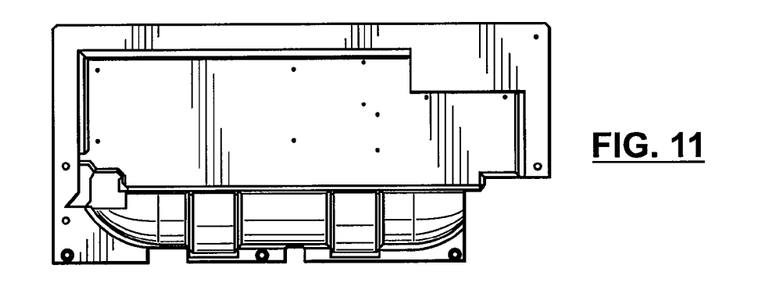
FIG. 11 is a top plan view of the top element.
Figure 12A:
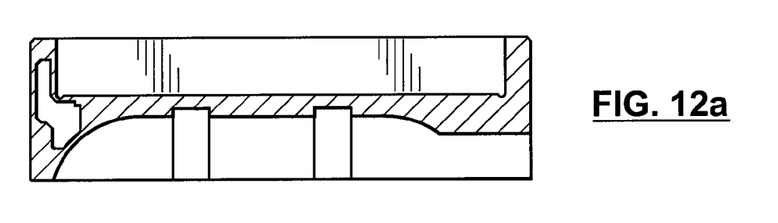
FIGS. 12*a* and 12*b* are sectional views taken along the lines c-c and d-d of FIG. 11, respectively.
Figure 12B:
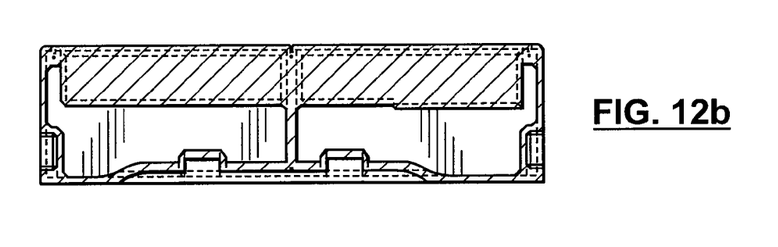
Figure 13A:
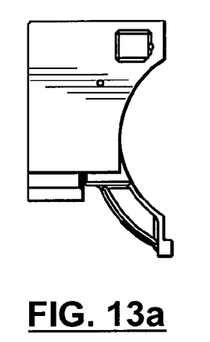
FIGS. 13*a, b* and *c* and further views of the top element.
Figure 13B:
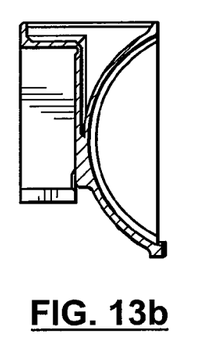
Figure 13C:
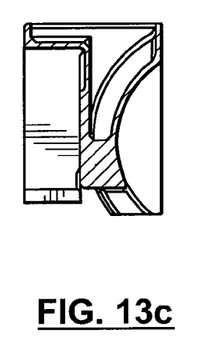

As shown in FIGS. 9a and 10 along one side of the upper shelf 140, the top element 100 shows a portion 160 of generally uniform thickness and having a profile corresponding to the profile of the cavity 190.

Figure 9B:
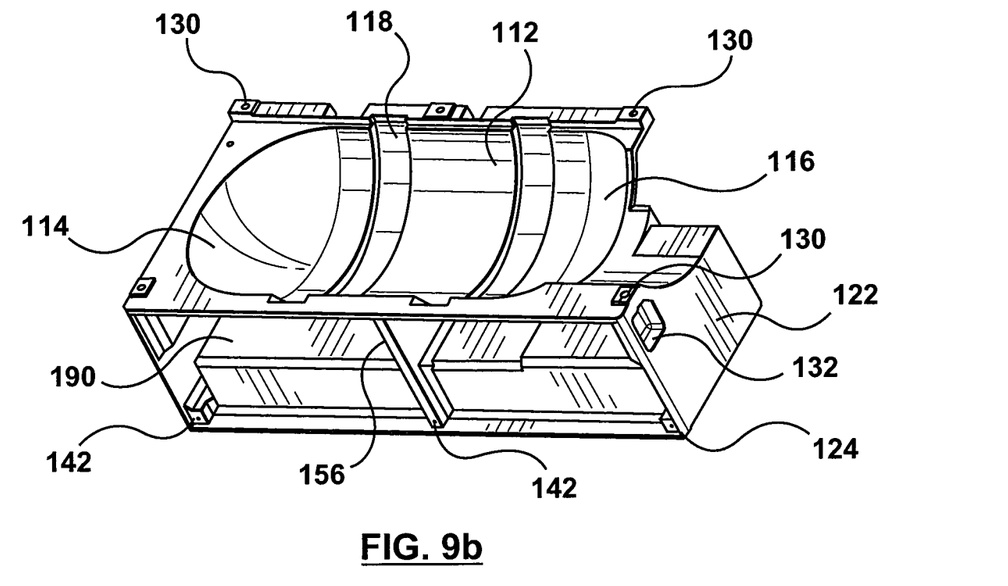

Referring to FIG. 9b, the top element 100 can be provided with an internal flange 156 to provide reinforcement to the section. As shown at 142, threaded bores can be provided to receive fasteners for the closure panel 102, and where necessary, portions of the top element 100 can be provided with increased thickness or reinforcement to provide sufficient material to form the threaded bores 142. It will also be understood that, where the fill material inserted into the cavities 90, 190 is permanently bonded in position, then it may be possible to omit the closure panels 22, 102.

Both of the top and bottom elements 20, 100 could be cast from metal such as iron or the like, for example. Iron is preferred to steel as it has a lower melting point. Other metals may be suitable, depending on the desired mass of the top and bottom elements 20, 100, taking into consideration the mass of the fill material as discussed below. Each casting would leave the respective element 20, 100 with the internal cavity 90, 190.

Aside from casting, other suitable forming techniques can be used to form the elements 20, 100. For example, the elements 20, 100 can be formed from stamping and/or cutting predetermined shapes from raw sheet metal, followed by a welding operation.

Each of the cavities 90, 190 can be filled with a fill material having a desired density, thereby enabling the top and bottom elements 20, 100 to be customized to a desired mass, depending on the particular application. In many cases, it is preferable to fill the cavities 90, 190 with a material having a relatively high density. In typical lift truck applications, the cavities 90, 190 may be filled with a material having a relatively high density to provide the desired mass so as to act as a counterweight, as discussed above. However, if the particular application does not require the same amount of weight, use of a less dense (and preferably inexpensive) material may be used to fill cavities 90, 190, or alternatively, if the top and bottom elements 20, 100 provide sufficient mass, then no fill material may be provided to fill cavities 90, 190.

If high density (and therefore high mass of the frame assembly) is desired, a suitable fill material can be, for example, lead. The lead is relatively inexpensive and may be poured into the cavities in molten form, with the openings for the cavities presented by the bottom 94 of the top element 20 and the outer sidewall 124 of the top element 100 orientated facing upwards. After the lead has solidified, each of the elements 20, 100 may then be closed by placing the respective closure panel 22, 102 in place and securing it with fasteners (not shown) inserted into the bores 82, 142.

Alternative materials may be used, and the fill material may not necessarily be inserted into the cavities in molten or liquid form. For example, the fill material could be provided as a powder or in granular form, and then maintained in the respective cavity by tight sealing of the corresponding closure panel. Alternatively, the fill material could be mixed with some bonding material, for example a resin or the like, to enable it to fully conform to the shape of the respective cavity 90, 190 and then to solidify, to ensure that it is securely held in place (and in this case the closure panels may not be necessary but optional). It will be understood that generally, to provide a fill material in powder or particulate form will result in some loss of effective overall or average density; however, for some applications this may be preferred. For some applications, the use of lead may be considered disadvantageous. Examples of alternative materials having relatively high densities are tungsten and bismuth.

A particular advantage of the present application relates to the fact that a large, dense frame assembly may serve as an adequate heat sink for the electronics component(s) of a FCPP. The thermal conductivity of the metal(s) combined with the surface area of the frame assembly may provide sufficient transfer of thermal energy to absorb and dissipate heat from the electronics component(s), such that an additional heat sink may not be required. In this regard, the frame assembly may also include a plurality of fins (not shown) provided on an external surface heat, and/or a fan (also not shown) to improve the transfer of thermal energy from the frame assembly to the air.

It is anticipated that those having ordinary skill in this art can make various modification to the one or more embodiments disclosed herein after learning the teaching of the present invention. However, these modifications should be considered to fall under the protection scope of the invention as defined in the following claims.

The invention claimed is:

1. A frame assembly for use in a fuel cell power module, the frame assembly comprising a plurality of elements configured to receive a fuel cell stack, a fuel cell storage vessel and balance of plant components for a fuel cell power module, wherein at least one element of the frame assembly includes a cavity and the frame assembly further comprises a fill material in the cavity wherein the at least one element comprises a first material and the fill material has a higher density than the first material and wherein the frame assembly is configured to correspond to the dimensions of a battery pack for a lift truck.

2. A frame assembly as claimed in claim 1, wherein the fill material is a high density material to increase the mass of the frame assembly.

3. A frame assembly as claimed in claim 2, wherein the at least one element comprises cast iron and wherein the fill material comprises lead.

4. A frame assembly as claimed in claim 3, including a closure panel for each cavity.

5. A frame assembly as claimed in claim 3, wherein the frame assembly is configured to correspond to the dimensions of a battery pack for a lift truck.

6. A frame assembly for a fuel cell power module, the frame assembly comprising a bottom element and a top element, wherein the top and bottom elements together are configured to substantially enclose a fuel storage vessel, wherein the top and bottom elements are configured to receive a fuel cell stack and balance of plant components of a fuel cell power module, wherein at least one of the top and bottom elements comprises a first material and includes an internal cavity and the internal cavity is filled with a fill material that has a higher density than the first material and wherein the frame assembly is configured to correspond to the dimensions of a battery pack for a lift truck.

7. A frame assembly as claimed in claim 6, wherein the top and bottom elements are configured to receive a fuel storage vessel that is generally cylindrical with hemispherical end portions.

8. A frame assembly as claimed in claim 7, wherein the top and bottom elements include complementary fuel cavities for receiving a fuel storage vessel, and recesses for securing straps for securing the fuel storage vessel to one of the top and bottom elements.

9. A frame assembly as claimed in claim 8, wherein both of the top and bottom elements include an internal cavity, and wherein the top element is open at one side thereof to reveal the internal cavity thereof and the bottom element is open at the bottom to reveal the internal cavity thereof.

10. A frame assembly as claimed in claim 9, wherein each of the top and bottom elements is provided with a closure panel secured thereto, for closing off the internal cavities of the top and bottom elements.

11. A frame assembly as claimed in claim 6, wherein the top element includes an upper shelf for accommodating elements of the fuel cell power module.

12. A frame assembly as claimed in claim 6, wherein the bottom element includes an outer sidewall defining an elongate rectangular slot portion, for receiving elements of a fuel cell power module.

13. A frame assembly as claimed in claim 6, wherein one of the top and bottom elements includes threaded bores and the other of the top and bottom elements includes openings for receiving fasteners, for engaging the threaded bores to secure the top and bottom elements together.

14. A fuel cell power module comprising a frame assembly as claimed in claim 6, further comprising:
a fuel cell stack mounted on the frame assembly;
a fuel storage device mounted on the frame assembly; and
balance of plant components mounted on the frame assembly.

15. A fuel cell power module as claimed in claim 14, wherein the balance of plant components comprise at least one electronics component, and the frame assembly is configured to dissipate heat from the electronics component.

16. A fuel cell power module as claimed in claim 14, wherein the balance of plant components comprise one or more components selected from: a pump, a valve, a humidifier, a radiator for discharging excess heat, and a control unit.

17. A fuel cell power module as claimed in claim 14, in combination with a lift truck.

18. A method of forming a frame element for use in a frame assembly for a fuel cell power module, the method comprising the steps of:
configuring the frame element to receive at least one of a fuel storage vessel, at least one component of balance of plant components of a fuel cell power module and a fuel cell stack;
providing the frame element with at least one planar outer face;
providing the frame element with an internal cavity opening onto the outer face; and
filling the internal cavity of the frame element with a fill material wherein the frame element comprises cast iron and the fill material comprises lead.

19. A method as claimed in claim 18, comprising forming the frame element by casting, and wherein the step of filling the internal cavity comprises pouring the fill material into the internal cavity in liquid form and permitting the fill material to solidify.

20. A method as claimed in claim 18, comprising forming the frame element by casting from iron and providing the fill material in the internal cavity in molten form at an elevated temperature, and permitting the fill material to cool and to solidify.

* * * * *